(12) United States Patent
Chandramouli

(10) Patent No.: US 10,628,471 B2
(45) Date of Patent: Apr. 21, 2020

(54) DOMAIN-SPECIFIC STOPWORD REMOVAL FROM UNSTRUCTURED COMPUTER TEXT USING A NEURAL NETWORK

(71) Applicant: FMR LLC, Boston, MA (US)

(72) Inventor: Aravind Chandramouli, Bangalore (IN)

(73) Assignee: FMR LLC, Boston, MA (US)

( * ) Notice: Subject to any disclaimer, the term of this patent is extended or adjusted under 35 U.S.C. 154(b) by 734 days.

(21) Appl. No.: 15/426,958

(22) Filed: Feb. 7, 2017

(65) Prior Publication Data
US 2018/0225568 A1    Aug. 9, 2018

(51) Int. Cl.
| | |
|---|---|
| *G06F 16/00* | (2019.01) |
| *G06F 16/33* | (2019.01) |
| *G06N 3/04* | (2006.01) |
| *G06F 16/31* | (2019.01) |
| *G06F 40/30* | (2020.01) |
| *G06F 40/216* | (2020.01) |
| *G06F 40/284* | (2020.01) |

(52) U.S. Cl.
CPC ........ *G06F 16/3344* (2019.01); *G06F 16/313* (2019.01); *G06F 40/216* (2020.01); *G06F 40/284* (2020.01); *G06F 40/30* (2020.01); *G06N 3/04* (2013.01)

(58) Field of Classification Search
CPC .................................................. G06F 16/3344
USPC ........................................................ 706/25
See application file for complete search history.

(56) References Cited

U.S. PATENT DOCUMENTS

| | | | |
|---|---|---|---|
| 7,421,418 B2* | 9/2008 | Nakano | G06F 16/334 |
| | | | 706/52 |
| 7,725,414 B2 | 5/2010 | Nigam et al. | |
| 8,473,510 B1* | 6/2013 | Tong | G06F 40/10 |
| | | | 707/769 |
| 8,533,208 B2 | 9/2013 | Sundaresan et al. | |
| 8,676,730 B2 | 3/2014 | Ghani et al. | |
| 8,818,788 B1 | 8/2014 | Mihalik et al. | |

(Continued)

OTHER PUBLICATIONS

Silva et al. "The Importance of Stop Word Removal on Recall Values in Text Categorization", 2003, IEEE, pp. 1661-1666. (Year: 2003).*
Mendez et al. "Tokenising, Stemming and Stopword Removal on Anti-spam Filtering Domain", 2006, Springer-Verlag Berlin Heidelberg, vol. 4177, pp. 449-458. (Year: 2006).*

(Continued)

*Primary Examiner* — Hien D Khuu
(74) *Attorney, Agent, or Firm* — Proskauer Rose LLP

(57) ABSTRACT

Methods and apparatuses are described for analyzing unstructured computer text for domain-specific stopword identification and removal. A computer data store stores unstructured text. A server computing device splits the unstructured text into phrases and generates tokens from the phrases. The server computing device generates a set of bootstrap keywords using the tokens. An artificial intelligence neural network executing on the server computing device generates a stopword training model. The server computing device generates a first set of candidate stopwords using the bootstrap keywords and the stopword training model. The server computing device generates regular expressions using the bootstrap keywords, and generates a second set of candidate stopwords using the regular expressions. The server computing device stores the candidate stopwords in the data store, and removes stopwords from the unstructured text using the data store.

15 Claims, 4 Drawing Sheets

(56) References Cited

U.S. PATENT DOCUMENTS

| | | | |
|---|---|---|---|
| 8,856,119 | B2 | 10/2014 | Bhagwan et al. |
| 9,037,464 | B1 | 5/2015 | Mikolov et al. |
| 9,043,197 | B1 | 5/2015 | Pasca et al. |
| 10,373,067 | B1* | 8/2019 | Chen .................. G06F 16/353 |
| 2006/0200342 | A1 | 9/2006 | Corston-Oliver et al. |
| 2007/0294199 | A1 | 12/2007 | Nelken et al. |
| 2008/0091423 | A1* | 4/2008 | Roy .................. G10L 15/26 704/235 |
| 2010/0082333 | A1* | 4/2010 | Al-Shammari ..... G06F 16/3338 704/10 |
| 2016/0335339 | A1* | 11/2016 | Venkataraman ........ G06F 16/78 |
| 2017/0228654 | A1* | 8/2017 | Skupin .................. G06N 5/04 |
| 2017/0255603 | A1* | 9/2017 | Kajinaga .............. G06F 40/284 |

OTHER PUBLICATIONS

Kim et al., "An Unsupervised Approach to Domain-Specific Term Extraction," Proceedings of the Australasian Language Technology Association Workshop 2009, University of New South Wales, Sydney, Australia, Dec. 3-4, 2009, pp. 94-98.

Saif, Hassan; Fernez, Miriam and Alani, Harith (2014). Automatic stopword generation using contextual semantics for sentiment analysis of Twitter. In: Proceedings of the ISWC 2014 Posters & Demonstrations Track.

Parisi-Baradad, Vincenc and Alexis-Michel Mugabushaka, "Corpus Specific Stop Words to Improve the Textual Analysis in Scientometrics," ISSI, Bogazici University Printhouse, 2015, 7 pages.

* cited by examiner

DOMAIN-SPECIFIC STOPWORD REMOVAL FROM UNSTRUCTURED COMPUTER TEXT USING A NEURAL NETWORK

TECHNICAL FIELD

This application relates generally to methods and apparatuses, including computer program products, for domain-specific stopword removal from unstructured computer text using a neural network.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. Often, the unstructured computer text contains stopwords, which are generally common words in a given language. These stopwords are considered as 'noise' in unstructured text, add little value to analytics, and need to be removed in order to improve the quality of the unstructured computer text from the perspective of understanding critical aspects of the text content— such as intent, sentiment, and the like—in downstream applications.

Present computer systems that handle removal of stopwords from unstructured computer text typically use pre-defined lists of generic stopwords, and add to those lists over time as new stopwords are identified. However, such systems suffer from the problem that the definition of informative value changes from domain to domain. For example, the word "what" may be a stopword in the context of a computerized search engine, but a question-answering computer system may consider the word "what" to be highly relevant and not a stopword.

As such, these computer systems typically fail to account for domain-specific considerations. For example, certain organizations may use terms or words that have meaning to the organization (e.g., ID numbers, dollar values, entity references, abbreviations, and the like) but are still considered stopwords that degrade the quality of the unstructured computer text. These domain-specific stopwords are noise that must be removed, but they are not generic enough to be filtered out by standard techniques.

Existing stopword removal techniques—such as defining regular expressions—do not solve the above-noted problem because such regular expressions are cumbersome to define and the number of possible combinations is very high. Present computer systems that leverage approaches such as Poisson distributions or Kullback-Liebler (KL) divergence techniques typically do not provide enough coverage to result in precise stopword removal for a large amount of unstructured computer text. And, existing computer systems make use of statistical quality measures like how frequently terms appear or how informative terms are in order to identify stopwords, but such techniques are generally inaccurate and fail to capture all of the critical stopwords in the text.

SUMMARY

Therefore, methods and systems are needed to conduct domain-specific stopword removal from unstructured computer text in real time using a neural network to produce high-quality unstructured computer text that can be used in downstream applications. The techniques described herein leverage highly-advanced artificial intelligence computing techniques to analyze unstructured computer text in order to remove domain-specific stopwords for the purposes of:
  Identifying and tagging themes present in the text;
  Identifying and tagging tonality of the themes;
  Profiling respondents to understand aspects of the respondents that have provided positive and/or negative feedback on a particular theme;
  Using the tagged text as quantitative data in statistical analysis; and
  Generating a robust graphical user interface to assist with effective interpretation of the tagged text.

The present methods, systems, and techniques can be advantageously implemented in a variety of real-world applications, including but not limited to
  Unstructured, domain-specific computer text captured as a part of human resources applications such as employee engagement surveys, employee exit interviews, training feedback forms, and manager feedback forms;
  Unstructured, domain-specific computer text captured as a part of customer-facing applications, such as customer feedback forms, customer interactions such as emails, phone logs, customer call center records, attitudinal data, and customer relationship management data; and
  Unstructured, domain-specific computer text captured as a part of social media applications, such as blog posts, chat logs, Facebook™ profiles and posts, Twitter™ posts, and so forth.

The invention, in one aspect, features a system used in a computing environment in which unstructured computer text is analyzed for domain-specific stopword identification and removal. The system comprises a computer data store including domain-specific unstructured text being input via a web page, input directly into the computer data store via a first computer file, or any combination thereof. The system comprises a server computing device in communication with the computer data store and programmed to split the unstructured text into one or more phrases. The server computing device is programmed to generate tokens from the phrases, where each token comprises a word. The server computing device is programmed to generate a set of bootstrap keywords by a) selecting a subset of the tokens that (i) appear frequently in the unstructured text or (ii) are determined to be uninformative, and b) inserting each token in the subset of the tokens into the computer data store as a bootstrap keyword. An artificial intelligence neural network executing on the server computing device is programmed to generate a stopword training model by creating a word vector for each token and inserting the word vector in a high-dimensional space that comprises the training model, where a position of each word vector in the high-dimensional space is based upon a semantic relationship between the corresponding word and surrounding words in the unstructured text. The server computing device is programmed to generate a first set of candidate stopwords by executing the stopword training model against the set of bootstrap keywords to determine one or more words in the unstructured text that are similar to the bootstrap keywords based upon the word vector for the bootstrap keywords. The server computing device is programmed to generate regular expressions based upon the set of bootstrap keywords by a) identifying a sequence of characters in one or more of the bootstrap keywords, b) identifying a syntactical pattern in the sequence of characters, and c) generating a regular expression using the syntactical pattern. The server computing device is programmed to generate a second set of candidate stopwords using the regular expressions and insert the first set of candidate stopwords and the second set of candidate stopwords into the computer data store as a set of final stopwords. The server computing device is programmed to remove stopwords from the unstructured text that match the set of final stopwords.

The invention, in another aspect, features a computerized method in which unstructured computer text is analyzed for domain-specific stopword identification and removal. A computer data store stores domain-specific unstructured text, the unstructured text being input via a web page, input directly into the computer data store via a first computer file, or any combination thereof. A server computing device in communication with the computer data store splits the unstructured text into one or more phrases. The server computing device generates tokens from the phrases, where each token comprises a word. The server computing device generates a set of bootstrap keywords by a) selecting a subset of the tokens that (i) appear frequently in the unstructured text or (ii) are determined to be uninformative, and b) inserting each token in the subset of the tokens into the computer data store as a bootstrap keyword. An artificial intelligence neural network executing on the server computing device generates a stopword training model by creating a word vector for each token and inserting the word vector in a high-dimensional space that comprises the training model, where a position of each word vector in the high-dimensional space is based upon a semantic relationship between the corresponding word and surrounding words in the unstructured text. The server computing device generates a first set of candidate stopwords by executing the stopword training model against the set of bootstrap keywords to determine one or more words in the unstructured text that are similar to the bootstrap keywords based upon the word vector for the bootstrap keywords. The server computing device generates regular expressions based upon the set of bootstrap keywords by a) identifying a sequence of characters in one or more of the bootstrap keywords, b) identifying a syntactical pattern in the sequence of characters, and c) generating a regular expression using the syntactical pattern. The server computing device generates a second set of candidate stopwords using the regular expressions and insert the first set of candidate stopwords and the second set of candidate stopwords into the computer data store as a set of final stopwords. The server computing device removes stopwords from the unstructured text that match the set of final stopwords.

The invention, in another aspect, features a computer readable storage medium comprising programmatic instructions for operation of a computing environment in which unstructured computer text is analyzed for domain-specific stopword identification and removal. The instructions are operable to cause a computer data store to store domain-specific unstructured text, the unstructured text being input via a web page, input directly into the computer data store via a first computer file, or any combination thereof. The instructions are operable to cause a server computing device in communication with the computer data store, and including an executable artificial intelligence neural network executing on the server computing device, to split the unstructured text into one or more phrases. The instructions are operable to cause the server computing device to generate tokens from the phrases, where each token comprises a word. The instructions are operable to cause the server computing device to generate a set of bootstrap keywords by a) selecting a subset of the tokens that (i) appear frequently in the unstructured text or (ii) are determined to be uninformative, and b_ inserting each token in the subset of the tokens into the computer data store as a bootstrap keyword. The instructions are operable to cause the artificial intelligence neural network to generate a stopword training model by creating a word vector for each token and inserting the word vector in a high-dimensional space that comprises the training model, where a position of each word vector in the high-dimensional space is based upon a semantic relationship between the corresponding word and surrounding words in the unstructured text. The instructions are operable to cause the server computing device to generate a first set of candidate stopwords by executing the stopword training model against the set of bootstrap keywords to determine one or more words in the unstructured text that are similar to the bootstrap keywords based upon the word vector for the bootstrap keywords. The instructions are operable to cause the server computing device to generate regular expressions based upon the set of bootstrap keywords by a) identifying a sequence of characters in one or more of the bootstrap keywords, b) identifying a syntactical pattern in the sequence of characters, and c) generating a regular expression using the syntactical pattern. The instructions are operable to cause the server computing device to generate a second set of candidate stopwords using the regular expressions and insert the first set of candidate stopwords and the second set of candidate stopwords into the computer data store as a set of final stopwords. The instructions are operable to cause the server computing device to remove stopwords from the unstructured text that match the set of final stopwords.

Any of the above aspects can include one or more of the following features. In some embodiments, the artificial intelligence neural network positions each word vector in the high-dimensional space to be in proximity to similar word vectors. In some embodiments, the server computing device splits the unstructured text into one or more phrases by locating a terminator in the unstructured text and separating the unstructured text on either side of the terminator into a phrase. In some embodiments, the server computing device is further programmed to determine one or more themes in the unstructured text after the stopwords are removed.

In some embodiments, the high-dimensional space comprises hundreds of dimensions. In some embodiments, the second set of candidate stopwords comprises a plurality of stopwords with a syntax that matches at least one regular expression. In some embodiments, the second set of candidate stopwords includes one or more stopwords that are not present in the unstructured text.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
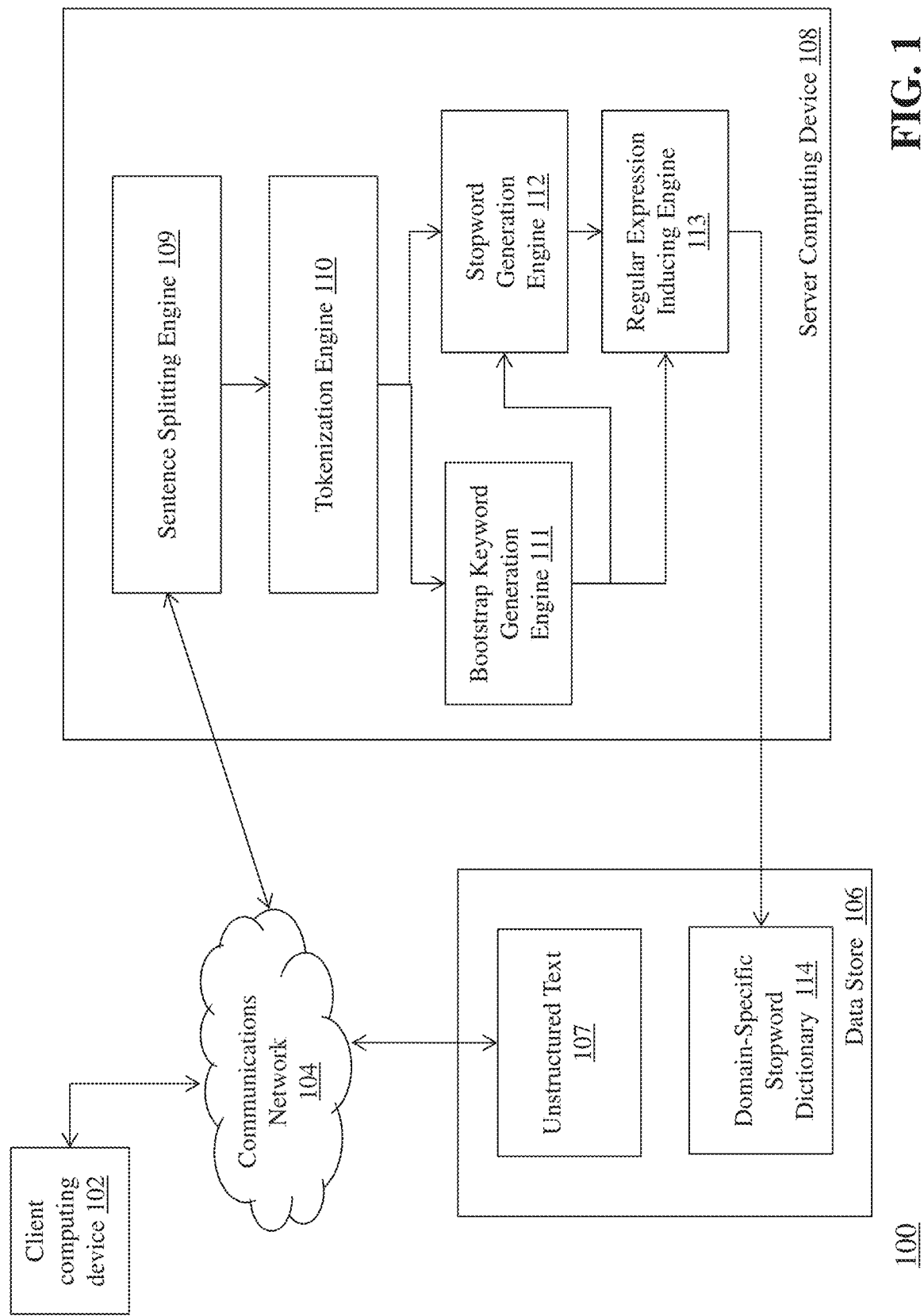
FIG. 1 is a block diagram of a system used in a computing environment in which unstructured computer text is analyzed for domain-specific stopword identification and removal.

FIG. 1 is a block diagram of a system 100 used in a computing environment in which unstructured computer text is analyzed for domain-specific stopword identification and removal. The system 100 includes a client computing device 102, a communications network 104, a data store 106 with unstructured computer text 107 and a domain-specific stopword dictionary 114, and a server computing device 108 having a processor that executes a sentence splitting engine 109, a tokenization engine 110, a bootstrap keyword generation engine 111, a stopword generation engine 112, and a regular expression inducing engine 113.

The client computing device 102 connects to the communications network 104 in order to communicate with the server computing device 106 to provide input and receive output relating to the process of analyzing unstructured computer text for domain-specific stopword identification and removal as described herein. For example, client computing device 102 can provide a detailed graphical user interface (GUI) that presents output resulting from the analysis methods and systems described herein, where the GUI is utilized by an operator to review and/or modify a list of stopwords generated by the system.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 108 and/or the data store 106 and displaying the data to a user of the client device 102.

The communication network 104 enables the other components of the system 100 to communicate with each other in order to perform the process of analyzing unstructured computer text for domain-specific stopword identification and removal as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more processors and one or more physical memory modules, and specialized software engines that execute on the processor of the server computing device 108, to receive data from other components of the system 100, transmit data to other components of the system 100, and perform functions for analyzing unstructured computer text for domain-specific stopword identification and removal as described herein. As mentioned above, the processor of the server computing device 106 executes a sentence splitting engine 109, a tokenization engine 110, a bootstrap keyword generation engine 111 which includes an artificial intelligence neural network, a stopword generation engine 112, and a regular expression inducing engine 113.

In some embodiments, the engines 109-113 are specialized sets of computer software instructions programmed onto a dedicated processor in the server computing device 106 and can include specifically-designated memory locations and/or registers for executing the specialized computer software instructions. Also, the bootstrap keyword generation engine 111 further includes a specialized artificial intelligence neural network for specific programming functions. Further explanation of the specific processing performed by the engines 109-113 will be provided below.

The data store 106 is a computing device (or in some embodiments, a set of computing devices) that is coupled to the server computing device 108 and is configured to receive, generate, and store specific segments of data relating to the process of analyzing unstructured computer text for domain-specific stopword identification and removal as described herein. In some embodiments, all or a portion of the data store 106 can be integrated with the server computing device 108 or be located on a separate computing device or devices. For example, the data store 106 can comprise one or more databases, such as MySQL™ available from Oracle Corp. of Redwood City, Calif. The data store 106 includes unstructured computer text 107 and a domain-specific stopword dictionary 114.

The unstructured text 107 is received and stored by the data store 106 via input from a web site/web page, or the unstructured text 107 is received and stored directly into the data store 106 by utilizing a first computer file (e.g., XML, CSV, TXT). For example, a user at client computing device 102 can utilize a GUI provided by the client computing device 102 to select and/or input the unstructured computer text (e.g. directly and/or as a computer file) and transmit the text to the data store 106. In another example, the data store 106 can retrieve the unstructured text from one or more repositories and/or computing systems (e.g., as a data feed and/or a file), such as customer relationship management systems, customer/employee feedback or survey systems, social media systems, human resources systems, and so forth.

The domain-specific stopword dictionary 114 is generated via the processing of the engines 109-113 on the unstructured computer text 107, as will be described in greater detail below. The domain-specific stopword dictionary 114 represents a list of final stopwords generated by the engines 109-113 that can be used to subsequently remove stopwords from additional unstructured computer text that is received into the system 100.

Figure 2A:
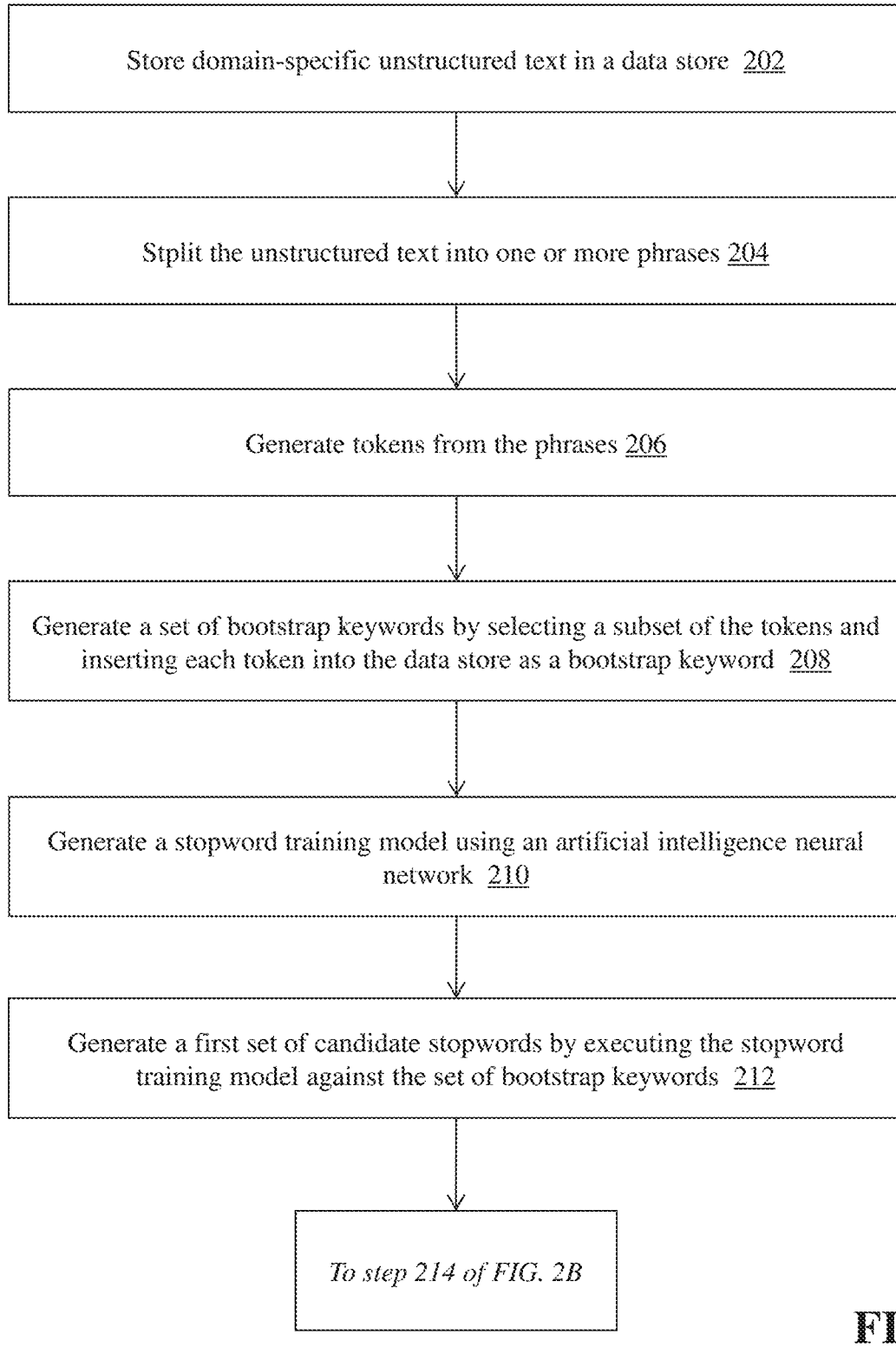
FIGS. 2A and 2B comprise a flow diagram of a method in which unstructured computer text is analyzed for domain-specific stopword identification and removal.
Figure 2B:
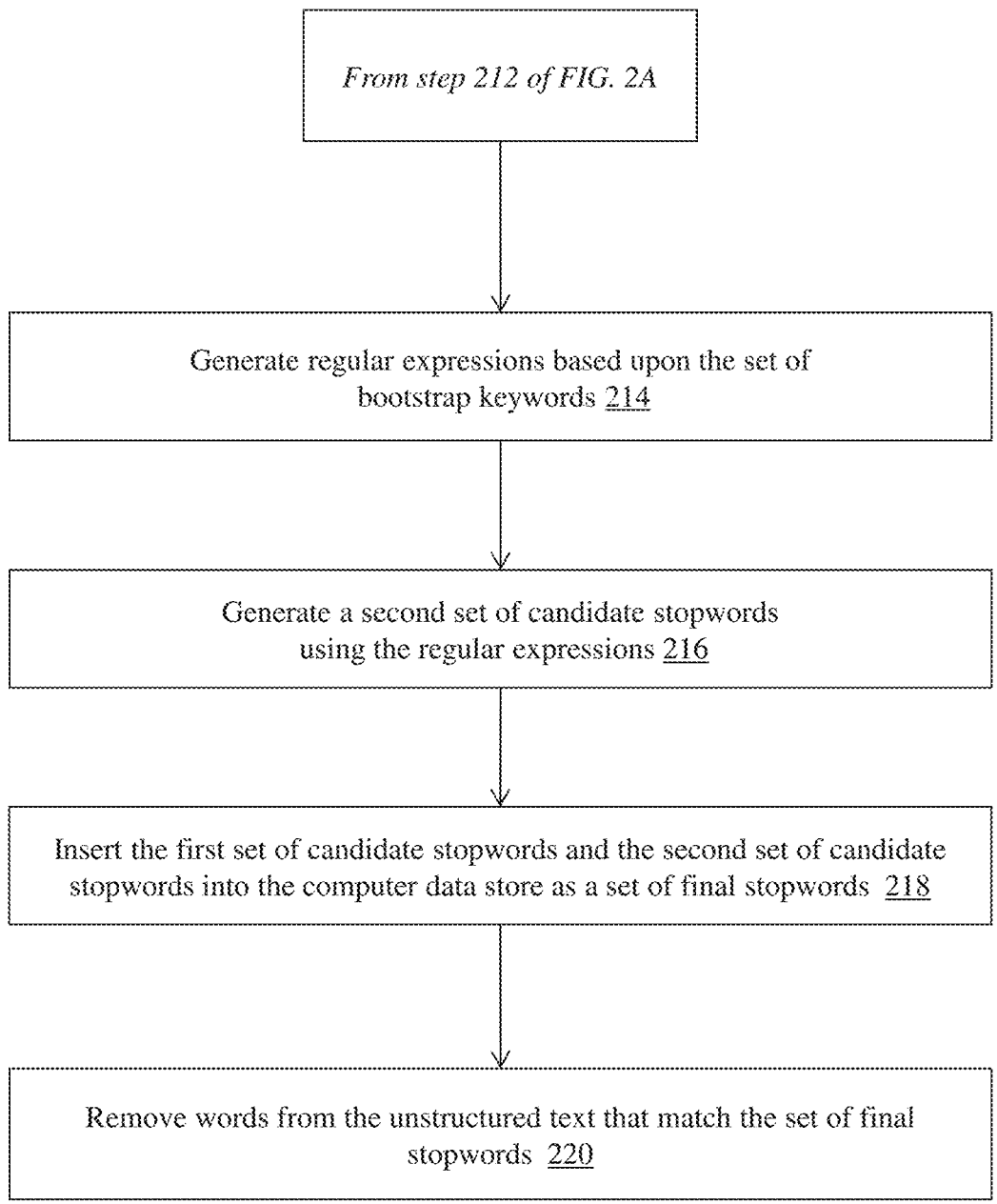

FIGS. 2A and 2B comprise a flow diagram of a method in which unstructured computer text is analyzed for domain-specific stopword identification and removal, using the system 100 of FIG. 1. The data store 106 stores (202) unstructured computer text 107 that is input to the data store 106 in a number of different ways—such as via a web page, via a computer file, or a combination of both.

In one example, the unstructured computer text can comprise data derived from a variety of sources, including but not limited to voice-to-text transcripts (e.g., of customer service calls), customer service representative notes (e.g., entered by the representative into a terminal during a customer interaction), verbatims for survey responses or other similar types of feedback, chat transcripts from online interactions, and so forth. In some embodiments, the unstructured computer text can include other elements such as a unique set of phrases from all phrases that are searched on one or more specified websites (e.g., URLs) for a specified duration, and/or a unique set of phrases from all phrases that are associated with one or more specified websites identified by URLs for a specified duration.

One example of a portion of unstructured text is "Work culture has improved considerably. Employee morale is low in the area I work in." In some embodiments, the unstructured text can be delimited, meaning that each word or phrase is separated by a specific delimiter or set of delimiters (e.g., an asterisk or a semi-colon) in order for the system 100 to quickly and efficiently segment the entire corpus of unstructured text into individual segments. It should be appreciated that, based upon the content of the unstructured text, the system can use a delimiter that is unique or does not regularly appear in the unstructured text to ensure that the unstructured text is not erroneously parsed. Upon receiving the unstructured computer text from the various sources, the data store 106 stores (202) the text for retrieval and use by the server computing device 108 as described below.

First, the sentence splitting engine 109 of the server computing device 108 retrieves all or a portion of the unstructured computer text 107 from the data store 106 and splits (204) the unstructured text into one or more phrases. In some embodiments, the sentence splitting engine 109 utilizes logic to locate a terminator within each line of unstructured text and split the line of text into multiple phrases at each terminator. Using the example above, the engine 109 receives the verbatim "Work culture has improved considerably. Employee morale is low in the area I work in." The engine 109 locates the period after the word "considerably" and determines that the period is a terminator—meaning that a specific thought or concept has completed. The engine 109 splits the verbatim into two phrases, namely "Work culture has improved considerably" and "Employee morale is low in the area I work in." Other types of terminators can include but are not limited to conjunctions or prepositions that serve to break up a sentence (e.g., "while," "but"), particularly dual-toned verbatims that have two different tonalities (e.g., "Work culture has improved considerably while employee morale is low in the area I work in.")

Next, the tokenization engine 110 receives the phrases from the sentence splitting engine 109 and generates (206) tokens from the phrases—where each token comprises a word in the overall phrase. In one embodiment, a token is a segment of the line of unstructured text that is separated by one or more spaces. For example, the engine 110 breaks the line "Work culture has improved considerably while employee morale is low in the area I work in" down into the following tokens: "work" "culture" "has" "improved" "considerably" "while" "employee" "morale" "is" "low" "in" "the" "area" "I" "work" "in." In some embodiments, the tokens are stored in the data store 106 as being associated with the line of unstructured text.

As can be appreciated, a token is a fundamental unit that a text processing system typically works with. By generating tokens from the unstructured text, the system 100 can apply sophisticated algorithms, e.g., to identify the part-of-speech of each token, form trigrams that are used for other modules like sentiment mining, clustering, and so forth.

The tokenization engine 110 then distributes at least a portion of the tokens to each of the bootstrap keyword generation engine 111 and the stopword generation engine 112. In one embodiment, the tokenization engine 110 transmits a subset of the tokens to the bootstrap keyword generation engine 111 for purposes of generating a set of initial stopwords that is used as input into the stopword generation engine 112—as will be described in greater detail below. The tokenization engine 110 does not transmit the entire universe of tokens to the bootstrap keyword generation engine 111 because in some instances, the entire universe can consist of millions or even billions of tokens and processing those through the bootstrap keyword generation engine 111 is too expensive and time-consuming.

The bootstrap keyword generation engine 111 generates (208) a set of bootstrap keywords by selecting a subset of the tokens and inserting the subset into the data store 106. The subset is determined by the engine 111 based upon which tokens (i) appear frequently in the set it receives (also called 'high-frequency' tokens) and (ii) which tokens are determined to be uninformative with respect to the context of the underlying text. For example, some of the tokens generated by the tokenization engine 110 may be first names (e.g., "Barbara," "David," "Alison," "Louis") and such tokens can occur with reasonably high-frequency in the unstructured text. Also, such tokens are considered uninformative because the tokens do not provide useful information regarding themes or context of the interaction represented in the unstructured text. Another example could be entity-specific acronyms or strings, such as ID numbers. Such ID numbers may have a distinct syntax (e.g., always begin with the prefix CID followed by six numerals), and the bootstrap keyword generation engine 111 can detect these ID numbers as appearing with high frequency in the unstructured text and conclude that these numbers are uninformative. Another example could be more generic words, such as 'the,' 'and,' 'a' and the like. The bootstrap keyword generation engine 111 selects a subset of the tokens—e.g., one name ("David") instead of all first names—as representative tokens to be transmitted to the stopword generation engine 112 as bootstrap keywords.

As the bootstrap keyword generation engine 111 is generating the bootstrap keywords, the tokenization engine 110 transmits the entire set of tokens it generated from the unstructured computer text to the stopword generation engine 112. In some instances, the tokenization engine 110 may have generated millions or billions of tokens from the unstructured computer text, and the engine 110 transmits this universe of tokens to the stopword generation engine 112.

The stopword generation engine 112 first utilizes an advanced artificial intelligence neural network executing on the processor of the server computing device 108 to generate (210) a stopword training model using the universe of tokens received from the tokenization engine 110. In one embodiment, the neural network is a shallow, two-layer network that is trained to reconstruct the linguistic context of words (e.g., the tokens produced from the unstructured text). The neural network receives the corpus of tokens from the tokenization engine 110 and creates a word vector for each token and inserts the word vectors in a high-dimensional space (e.g., several hundred dimensions). The neural network positions the word vectors in the high-dimensional vector space such that words that share common contexts in the unstructured computer text are located in close proximity to one another. Exemplary algorithms that can be used in the neural network processing are Word2vec (available from http://deeplearning4j.org/word2vec), Glove (available from http://nlp.stanford.edu/projects/glove) or BSG (described in "Bayesian Neural Word Embedding" by Oren Barkan, Tel Aviv University, dated Jun. 5, 2016, available from https://arxiv.org/abs/1603.06571 which is incorporated herein by reference).

Once the neural network completes its processing of the corpus of tokens and generates the stopword training model, the stopword generation engine 112 takes the bootstrap keywords received as input from the bootstrap keyword generation engine 111 and generates (212) a set of candidate stopwords by executing the stopword training model against the set of bootstrap keywords to determine one or more words in the unstructured text that are similar to the bootstrap keywords based upon the word vector for the bootstrap keywords. For example, if the stopword generation engine 112 uses the bootstrap keyword "David" as input to the stopword training model, the stopword generation engine 112 determines a set of candidate stopwords—e.g., "Barbara," "Carol," "Alison," "Louis," "Gary"—that are similar to the bootstrap keyword based upon their proximity to the bootstrap keyword in the stopword training model. The stopword generation engine 112 performs this step against each keyword in the set of bootstrap keywords to generate the set of candidate stopwords. In some cases, the stopword generation engine 112 may determine a limited set of candidate stopwords, such as the five most similar keywords in the stopword training model.

Once the stopword generation engine 112 has generated the set of candidate stopwords, the stopword generation engine 112 transmits the candidate stopwords to the regular expression inducing engine 113. The regular expression inducing engine 113 also receives the set of bootstrap keywords from the bootstrap keyword generation engine 111.

The purpose of the regular expression inducing engine 113 is to use the bootstrap keywords to generate (214) regular expressions. For example, as mentioned above, one of the bootstrap keywords can be a date (e.g., 10/15/2015), as dates can occur with high frequency in the unstructured computer text and are considered uninformative. The regular expression inducing engine 113 identifies a sequence of characters in one or more of the bootstrap keywords. Using the above example, the regular expression inducing engine 113 identifies the string 10/15/2015 as a sequence of characters. The engine 113 then identifies a syntactical pattern in the sequence of characters—for the string 10/15/2015, the engine 113 identifies the pattern nn/nn/nnnn, where n denotes a numeral. The regular expression inducing engine 113 recognizes this pattern as being representative of a date, and adjusts the pattern accordingly—e.g., mm/dd/yyyy where m denotes month, d denotes day, and y denotes year—to generate a regular expression.

The regular expression inducing engine 113 then uses the regular expressions to generate (216) specific keywords as a second set of candidate stopwords, and adds the second set of candidate stopwords to the first set of candidate stopwords generated previously. For example, using the regular expression mm/dd/yyyy, the regular expression inducing engine 113 generates all possible dates under that syntactical format and inserts the dates as candidate stopwords—this includes dates that are not contained in the corpus of unstructured text.

Once the first set of candidate stopwords and second set of candidate stopwords is combined, the regular expression inducing engine 113 inserts (218) the candidate stopwords in the domain-specific stopword dictionary 114 of the data store 106 as a set of final stopwords.

Figure 3:
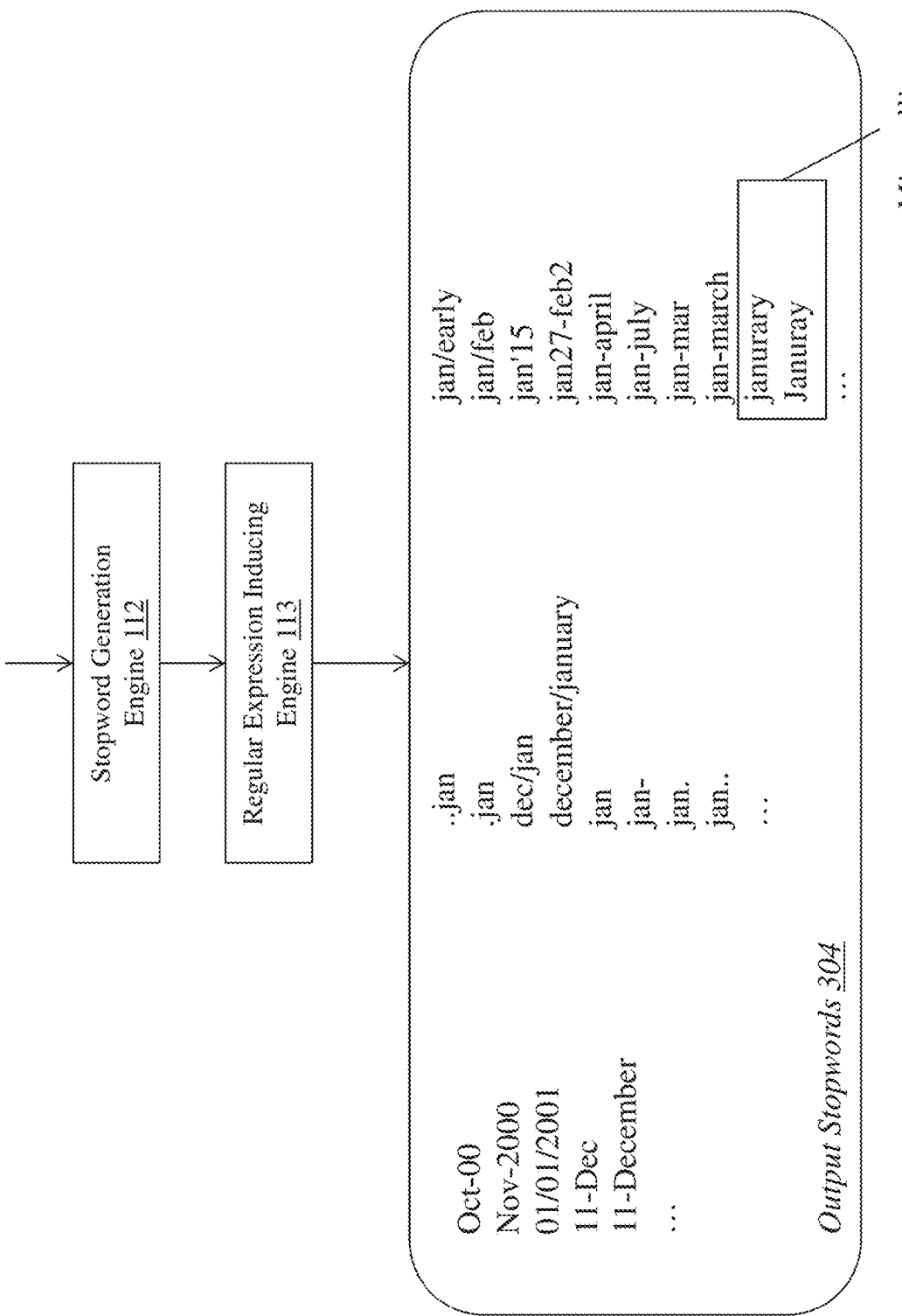
FIG. 3 is a diagram of an exemplary bootstrap keyword input into the stopword generation engine and the resulting exemplary output from the regular expressing inducing engine.

FIG. 3 is a diagram of an exemplary bootstrap keyword input into the stopword generation engine 112 and the resulting exemplary output from the regular expressing inducing engine 113 that includes the first set of candidate stopwords (as detected by the stopword generation engine 112) and the second set of candidate stopwords (as generated by the regular expression inducing engine 113). As shown in FIG. 3, the input bootstrap keyword 302 is the date '01/04/2005.' As described above, the stopword generation engine 112 executes the stopword training model against the bootstrap keyword 302 '01/04/2005' to select the first set of candidate stopwords in the corpus of unstructured text that are similar to the bootstrap keyword 302. The regular expression inducing engine 113 then processes the bootstrap keyword 302 to generate the second set of candidate stopwords which includes dates that follow a similar or the same syntactic pattern as the bootstrap keyword 302. The system 100 can also detect and generate stopwords based upon misspelled words in the unstructured text. The system 100 then produces the output stopwords 304 that are stored in the dictionary 114.

The system 100 can then leverage the contents of the domain-specific stopword dictionary 114 to quickly and efficiently remove (220) stopwords from subsequently-received unstructured computer text. For example, the system 100 can receive a corpus of newly-generated unstructured text (e.g., from a transcript) and compare the text against the domain-specific stopword dictionary 114 to quickly filter out stopwords from the text.

In some embodiments, the filtered computer text can then be analyzed by, e.g., a text processing engine or other type of data analysis engine to understand themes and sentiment present in the unstructured text, including for example, identifying and tagging themes present in the text; identify and tagging tonality of the themes, profiling users or customers to understand aspects that have provided positive and/or negative feedback on a particular theme; using the tagged text as quantitative data in statistical analysis; and generating a robust graphical user interface to assist with effective interpretation of the tagged text.

The systems and methods described herein advantageously enable the identification of the underlying reasons and/or issues presented on a customer call, so as to allow for potential remediation of the issue by adjusting, e.g., a customer website that would prevent future customers from calling on the same issue. Therefore, the accuracy of the modeling techniques described herein has a direct correlation to reduction in call volume at a call center.

The processing and output of the systems and methods described herein can advantageously be applied to a variety of technical use cases. In one example, the system can apply the stopword removal techniques to an automated 'chat bot' that receives computerized interaction text from customers via a browser-based text chat application, parses the interaction text to understand the reason for the customer interaction, and generates an automatic response to the interaction. In such instances, the chat bot is augmented to utilize the stopword removal techniques to improve the quality of the computerized interaction text so that the chat bot has better cognitive understanding of the reason for the customer interaction and can thus produce a more accurate and thorough response.

In another example, the system can apply the stopword removal techniques described herein to computerized voice transcripts of customer calls—such as calls relating to customer account closures—in order to better understand the reason(s) behind why a customer opted to close his or her account. The stopword removal techniques enable the removal of 'noise' and assist the system in isolating specific signals or clues as to why the account was closed.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for domain-specific stopword identification and removal, the system comprising: a computer data store including domain-specific unstructured text, the unstructured text being input via a web page and input directly into the computer data store via a first computer file, and a server computing device in communication with the computer data store and programmed to: split the unstructured text into one or more phrases; generate tokens from the phrases, wherein each token comprises a word; generate a set of bootstrap keywords by: a) selecting a subset of the tokens that (i) appear frequently in the unstructured text or (ii) are determined to be uninformative, and b) inserting each token in the subset of the tokens into the computer data store as a bootstrap keyword; generate, using an artificial intelligence neural network executing on the server computing device, a stopword training model by creating a word vector for each token and inserting the word vector in a high-dimensional space that comprises the training model, wherein a position of each word vector in the high-dimensional space is based upon a semantic relationship between a corresponding word and surrounding words in the unstructured text, generate a first set of candidate stopwords by executing the stopword training model against the set of bootstrap keywords to determine one or more words in the unstructured text that are similar to the bootstrap keywords based upon the word vector for the bootstrap keywords; generate regular expressions based upon the set of bootstrap keywords by: a) identifying a sequence of characters in one or more of the bootstrap keywords, b) identifying a syntactical pattern in the sequence of characters, and c) generating a regular expression using the syntactical pattern; generate a second set of candidate stopwords using the regular expressions and insert the first set of candidate stopwords and the second set of candidate stopwords into the computer data store as a set of final stopwords; and remove stopwords from the unstructured text that match the set of final stopwords.

2. The system of claim 1, wherein the artificial intelligence neural network positions each word vector in the high-dimensional space to be in proximity to similar word vectors.

3. The system of claim 1, wherein the server computing device splits the unstructured text into one or more phrases by locating a terminator in the unstructured text and separating the unstructured text on either side of the terminator into a phrase.

4. The system of claim 1, wherein the server computing device is further programmed to determine one or more themes in the unstructured text after the stopwords are removed.

5. The system of claim 1, wherein the high-dimensional space comprises hundreds of dimensions.

6. The system of claim 1, wherein the second set of candidate stopwords comprises a plurality of stopwords with a syntax that matches at least one regular expression.

7. The system of claim 6, wherein the second set of candidate stopwords includes one or more stopwords that are not present in the unstructured text.

8. A computerized method in which unstructured computer text is analyzed for domain-specific stopword identification and removal, the method comprising: storing, in a computer data store, domain-specific unstructured text, the unstructured text being input via a web page and input directly into the computer data store via a first computer file; splitting, by a server computing device in communication with the computer data store, the unstructured text into one or more phrases; generating, by the server computing device, tokens from the phrases, wherein each token comprises a word; generating, by the server computing device, a set of bootstrap keywords by: a) selecting a subset of the tokens that (i) appear frequently in the unstructured text or (ii) are determined to be uninformative, and b) inserting each token in the subset of the tokens into the computer data store as a bootstrap keyword; generating, by an artificial intelligence neural network executing on the server computing device, a stopword training model by creating a word vector for each token and inserting the word vector in a high-dimensional space that comprises the training model, wherein a position of each word vector in the high-dimensional space is based upon a semantic relationship between a corresponding word and surrounding words in the unstructured text; generating, by the server computing device, a first set of candidate stopwords by executing the stopword training model against the set of bootstrap keywords to determine one or more words in the unstructured text that are similar to the bootstrap keywords based upon the word vector for the bootstrap keywords; generating, by the server computing device regular expressions based upon the set of bootstrap keywords by: a) identifying a sequence of characters in one or more of the bootstrap keywords, b) identifying a syntactical pattern in the sequence of characters, and c) generating a regular expression using the syntactical pattern; generating, by the server computing device, a second set of candidate stopwords using the regular expressions and insert the first set of candidate stopwords and the second set of candidate stopwords into the computer data store as a set of final stopwords; and removing, by the server computing device, stopwords from the unstructured text that match the set of final stopwords.

9. The method of claim 8, wherein the artificial intelligence neural network positions each word vector in the high-dimensional space to be in proximity to similar word vectors.

10. The method of claim 8, wherein the server computing device splits the unstructured text into one or more phrases by locating a terminator in the unstructured text and separating the unstructured text on either side of the terminator into a phrase.

11. The method of claim 8, wherein the server computing device is further programmed to determine one or more themes in the unstructured text after the stopwords are removed.

12. The method of claim 8, wherein the high-dimensional space comprises hundreds of dimensions.

13. The method of claim 8, wherein the second set of candidate stopwords comprises a plurality of stopwords with a syntax that matches at least one regular expression.

14. The method of claim 13, wherein the second set of candidate stopwords includes one or more stopwords that are not present in the unstructured text.

15. A non-transitory computer readable storage medium comprising programmatic instructions for operation of a computing environment in which unstructured computer text is analyzed for domain-specific stopword identification and removal, the instructions operable to cause a computer data store to store domain-specific unstructured text, the unstructured text being input via a web page and input directly into the computer data store via a first computer file; and a server computing device in communication with the computer data store, and including an executable artificial intelligence neural network executing on the server computing device, to: split the unstructured text into one or more phrases; generate tokens from the phrases, wherein each token comprises a word; generate a set of bootstrap keywords by a) selecting a subset of the tokens that (i) appear frequently in the unstructured text or (ii) are determined to be uninformative, and b) inserting each token in the subset of the tokens into the computer data store as a bootstrap keyword; generate, by the artificial intelligence neural network, a stopword training model by creating a word vector for each token and inserting the word vector in a high-dimensional space that comprises the training model, wherein a position of each word vector in the high-dimensional space is based upon a semantic relationship between a corresponding word and surrounding words in the unstructured text; generate a first set of candidate stopwords by executing the stopword training model against the set of bootstrap keywords to determine one or more words in the unstructured text that are similar to the bootstrap keywords based upon the word vector for the bootstrap keywords; generate regular expressions based upon the set of bootstrap keywords by: a) identifying a sequence of characters in one or more of the bootstrap keywords, b) identifying a syntactical pattern in the sequence of characters, and c) generating a regular expression using the syntactical pattern; generate a second set of candidate stopwords using the regular expressions and insert the first set of candidate stopwords and the second set of candidate stopwords into the computer data store as a set of final stopwords; and remove stopwords from the unstructured text that match the set of final stopwords.

* * * * *